(12) United States Patent
He et al.

(10) Patent No.: US 11,623,571 B2
(45) Date of Patent: Apr. 11, 2023

(54) REARVIEW MIRROR WITH RGB INDICATOR LAMP

(71) Applicant: Jiangsu Haihua Auto Parts Co., Ltd., Danyang (CN)

(72) Inventors: Yuncai He, Danyang (CN); Junhua He, Danyang (CN); Yuan Zhong, Danyang (CN)

(73) Assignee: Jiangsu Haihua Auto Parts Co., Ltd., Danyang (CN)

( * ) Notice: Subject to any disclaimer, the term of this patent is extended or adjusted under 35 U.S.C. 154(b) by 0 days.

(21) Appl. No.: 17/830,614

(22) Filed: Jun. 2, 2022

(65) Prior Publication Data

US 2022/0388448 A1    Dec. 8, 2022

(51) Int. Cl.
*B60R 1/12*       (2006.01)

(52) U.S. Cl.
CPC .................. *B60R 1/1207* (2013.01)

(58) Field of Classification Search
CPC ...... B60Q 1/2665; B60Q 1/258; B60R 1/1207
See application file for complete search history.

(56) References Cited

U.S. PATENT DOCUMENTS

| | | | | |
|---|---|---|---|---|
| 8,083,386 | B2 * | 12/2011 | Lynam | B60Q 1/26 362/494 |
| 8,169,307 | B2 * | 5/2012 | Nakamura | B60Q 1/2665 340/463 |
| 11,325,536 | B2 * | 5/2022 | Huizen | F21S 43/249 |
| 2018/0170247 | A1 * | 6/2018 | Ramos, II | B60Q 1/0035 |

* cited by examiner

*Primary Examiner* — Matthew J. Peerce
(74) *Attorney, Agent, or Firm* — Dinsmore & Shohl LLP

(57) ABSTRACT

A rearview mirror with an RGB indicator lamp is provided, and belongs to the technical field of vehicle rearview mirrors. The rearview mirror includes a mirror shell and a mirror frame, and further includes a light module. The light module is installed inside the mirror shell, and a light-emitting panel of the light module is installed on the mirror frame. The light module is compact in structure, small in size and convenient to install on the rearview mirror. Meanwhile, the light-emitting panel is arranged on the mirror frame and integrated with the mirror frame, and the overall color is coordinated and unified.

4 Claims, 4 Drawing Sheets

REARVIEW MIRROR WITH RGB INDICATOR LAMP

CROSS-REFERENCE TO RELATED APPLICATIONS

The present application claims the priority benefit of Chinese Patent Application No. 202121230310.4, filed with the Chinese Patent Office on Jun. 3, 2021 and entitled "REARVIEW MIRROR WITH RGB INDICATOR LAMP", the contents of which is incorporated herein by reference in its entirety.

TECHNICAL FIELD

The present disclosure relates to a rearview mirror with an RGB indicator lamp, and belongs to the technical field of rearview mirrors of the vehicle.

BACKGROUND ART

The rearview mirror of a vehicle is mainly used for observing road conditions behind and at the side of the vehicle. In order to further display some auxiliary information related to driving the vehicle, some indicator lamps are installed on the rearview mirror. The indicator lamps are used in cooperation with indicating patterns for displaying related information, so as to visually display the information of vehicle conditions and road conditions.

An existing indicator lamp is generally installed on a shell of the rearview mirror and fixed through buckles and screws. However, the existing indicator lamp is directly installed on a certain hole of the mirror shell, so that the overall color of the rearview mirror is not coordinated, and the impressions are affected. Moreover, the indicator lamp is generally a point light source and has the problems of non-uniform light emitting and insufficient sealing performance.

SUMMARY

The technical problem to be solved by the present disclosure is to provide a rearview mirror with a red-green-blue (RGB) indicator lamp. The rearview mirror solves the technical problems that when an indicator lamp is installed on a shell of the rearview mirror, the overall color of the rearview mirror is not coordinated, and the impressions are affected. In addition, since the indicator lamp is generally a point light source, light emitting is not uniform, and the sealing performance is insufficient.

The technical problem to be solved by the present disclosure is achieved through the following technical scheme.

A rearview mirror with an RGB indicator lamp includes a mirror shell and a mirror frame. The review mirror further includes a light module. The light module is installed inside the mirror shell, and the light-emitting panel of the light module is installed on the mirror frame.

In some embodiments, the light module may include a housing, a circuit board, RGB lamp beads, a light path part and a light-emitting panel. The circuit board, the RGB lamp beads, the light path part and the light-emitting panel each may be fixed in the housing.

In some embodiments, the light path part may be a curved tube, the inner wall of the curved tube may be provided with a diffuse reflection coating or texture.

In some embodiments, the RGB lamp beads may include three RGB lamp beads. The three RGB lamp beads may be fixedly connected with the circuit board, and the three RGB lamp beads each may correspond to a light inlet portion of the light path part.

In some embodiments, the rearview mirror further may include a quick plug wire. The quick plug wire may be electrically connected with the circuit board.

In some embodiments, when the light-emitting panel may do not emit light, the light-emitting panel may display black.

In some embodiments, the light-emitting panel may be positioned on an inner side of the mirror frame.

The present embodiments have the following beneficial effects.

Firstly, the light module is compact in structure, small in size and convenient to install on the rearview mirror. Meanwhile, the light-emitting panel is arranged on the mirror frame and integrated with the mirror frame, and the overall color is coordinated and unified.

Secondly, the light module is integrally packaged in the housing, the size is small, the cost is low, the sealing performance is good, and the light leakage phenomenon cannot occur. Meanwhile, the RGB lamp beads are subjected to diffuse reflection through the special curved surface design of the light path part, which greatly improves the uniformity of light. Moreover, various colors can be displayed according to setting, and the individuation degree is high.

List of reference signs: 1 mirror shell; 2 light-emitting panel; 3 light path part; 4 RGB lamp bead; 5 circuit board; 6 quick plug wire; 7 housing; and 8 mirror frame.

DETAILED DESCRIPTION OF THE EMBODIMENTS

In order to easily understand the technical means, creative features, achievement purposes and efficacy of the present disclosure, the present disclosure is further described below in conjunction with specific figures.

Figure 1:
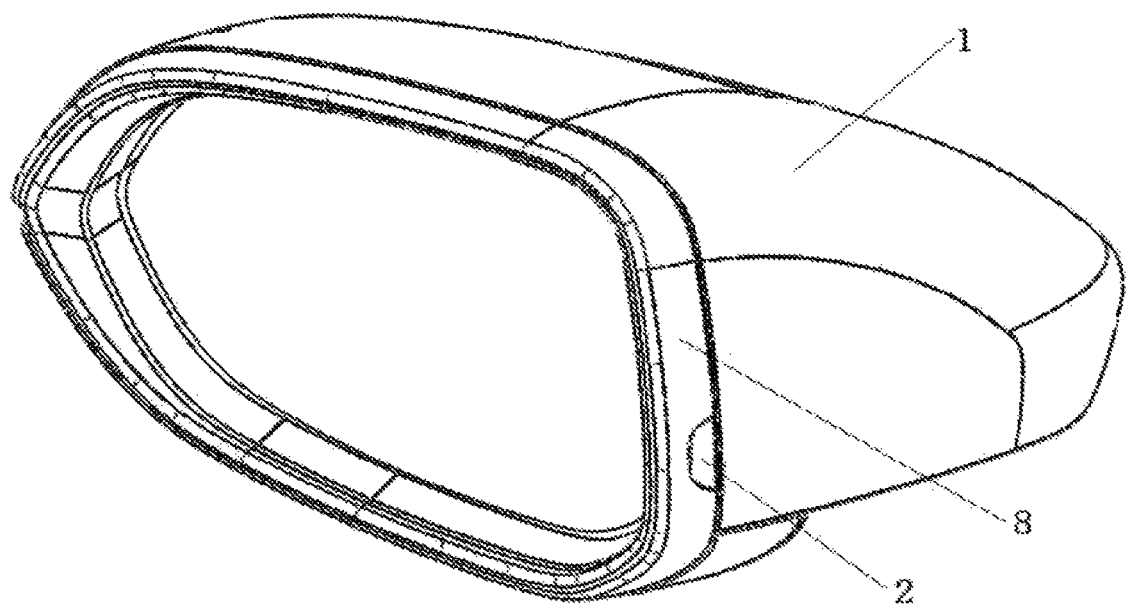
FIG. 1 is a schematic diagram of a three-dimensional structure of a rearview mirror with an RGB indicator lamp according to an embodiment of the present disclosure.
Figure 2:
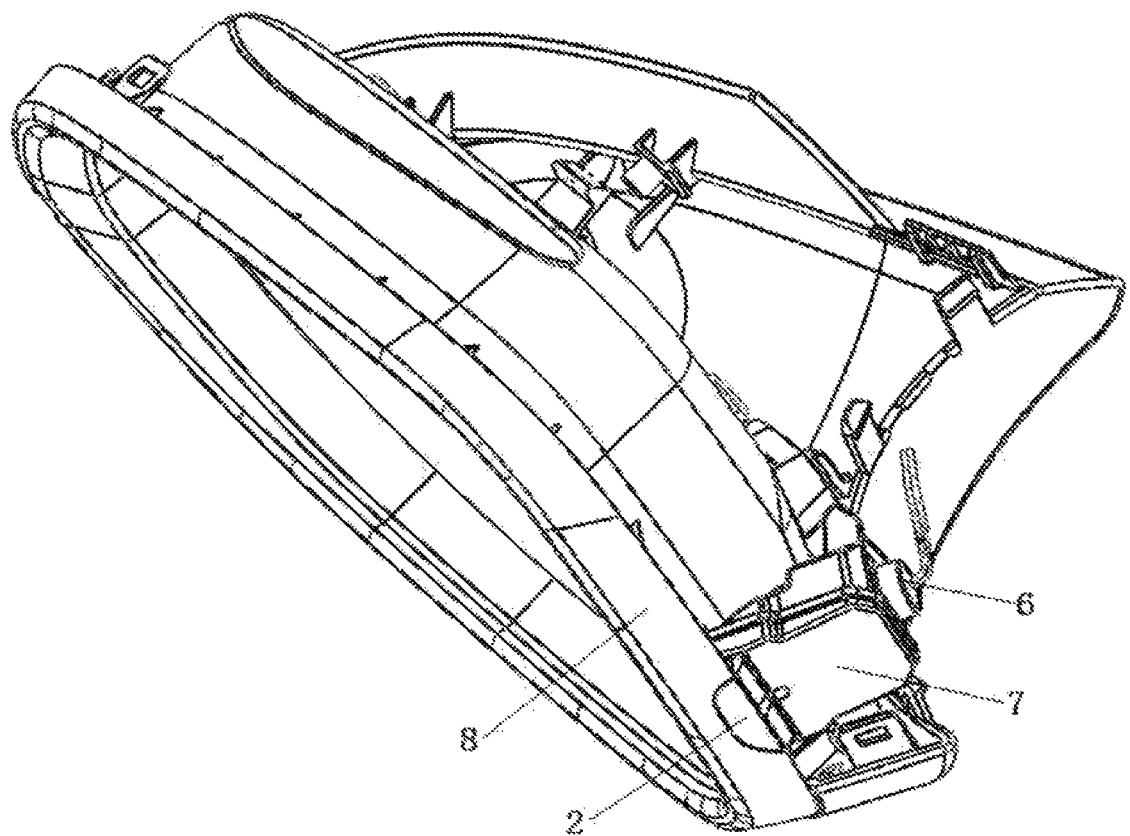
FIG. 2 is another schematic diagram of a three-dimensional structure of a rearview mirror with an RGB indicator lamp according to an embodiment of the present disclosure after a light module of the rearview mirror with an RGB indicator lamp is installed.
Figure 3:
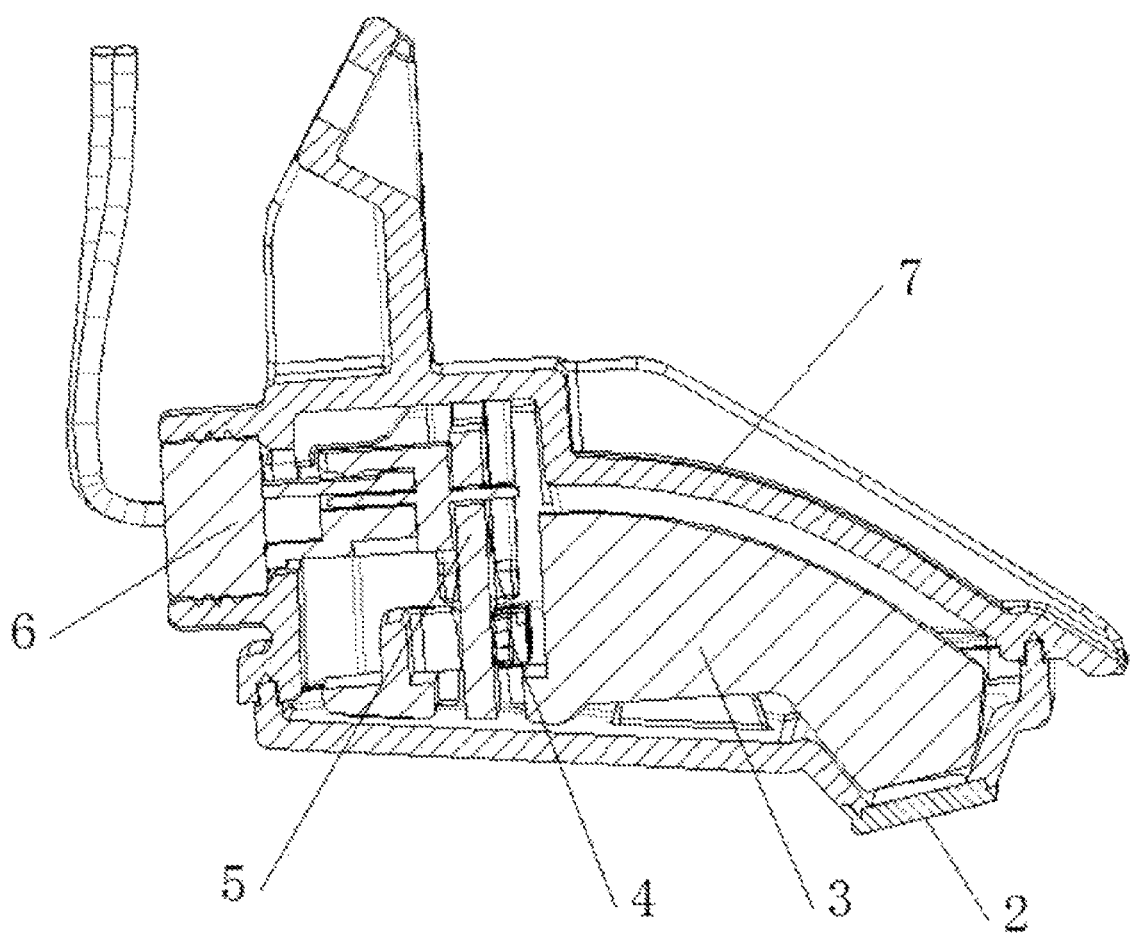
FIG. 3 is a schematic diagram of a cross-sectional structure of the light module.
Figure 4:
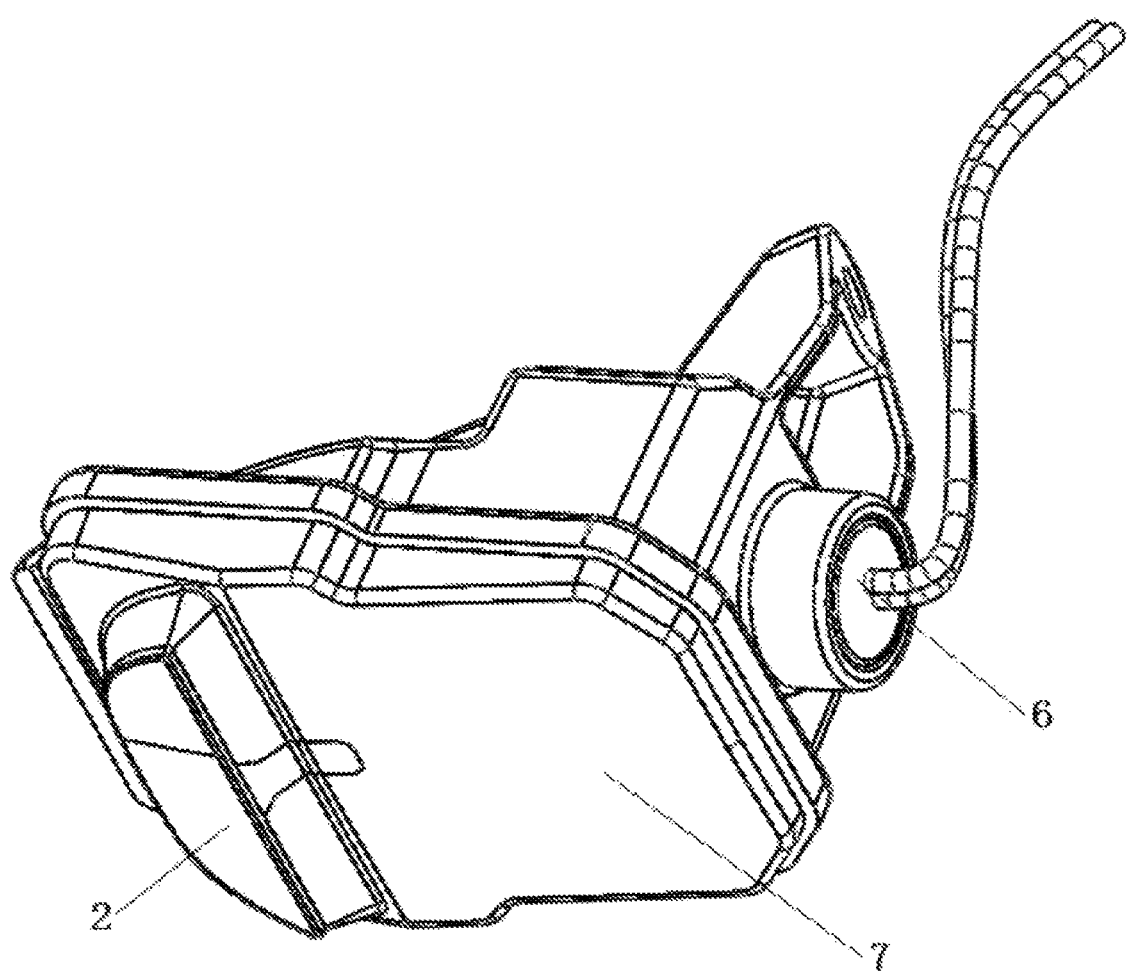
FIG. 4 is a schematic diagram of a three-dimensional structure of the light module.
Figure 5:
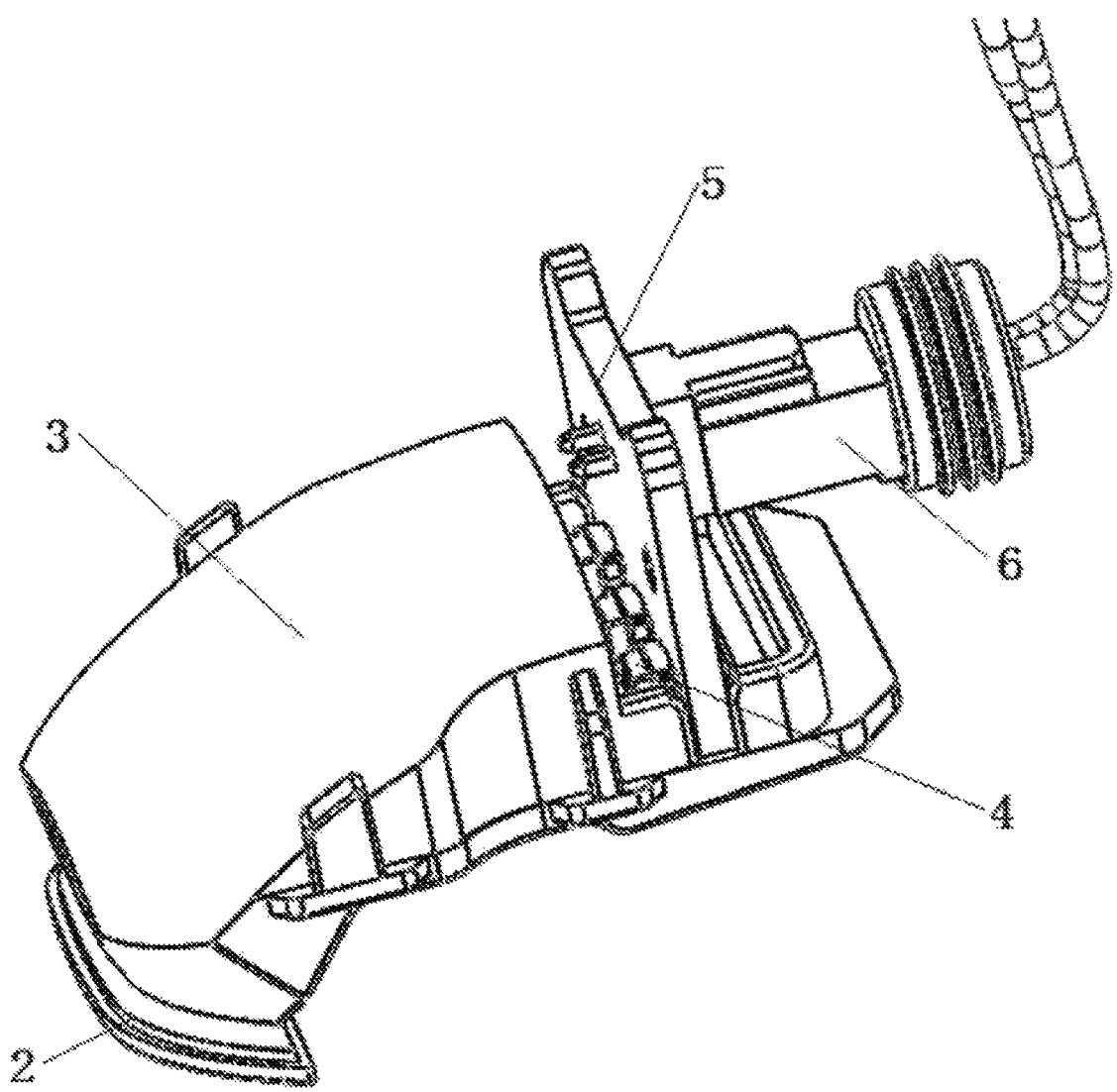
FIG. 5 is a schematic structural diagram of an interior of the light module.

As shown in FIG. 1 to FIG. 5, a rearview mirror with an RGB indicator lamp includes a mirror shell 1 and a mirror frame 8, and further includes a light module. The light module is installed inside the mirror shell 1, and the light-emitting panel 2 of the light module is installed on the mirror frame 8.

The light module includes a housing 7, a circuit board 5, RGB lamp beads 4, a light path part 3 and a light-emitting panel 2. The circuit board 5, the RGB lamp beads 4, the light path part 3 and the light-emitting panel 2 are all fixed in the housing 7. It needs to be noted that the RGB lamp beads 4 can also be replaced with lamp beads with common light colors, and the effect of the rearview mirror can also be achieved.

The light path part 3 is a curved tube, and the inner wall of the curved tube is provided with a diffuse reflection coating or texture. Meanwhile, the curved surface of the light path part 3 is specially designed, so that light can be controlled to be emitted in a target range and diffused, and the light which is uniform and concentrated at the target location is emitted.

The RGB lamp beads 4 include three RGB lamp beads, the three RGB lamp beads 4 are fixedly connected with the circuit board 5, and the three RGB lamp beads 4 each correspond to the light inlet portion of the light path part 3.

The rearview mirror further includes a quick plug wire 6. The quick plug wire 6 is electrically connected with the circuit board 5, and connection and maintenance of the circuit board 5 and a body control module of a vehicle are facilitated.

When the light-emitting panel 2 does not emit light, the light-emitting panel 2 displays black, and the light transmittance of the light-emitting panel 2 is about 10% to 20%. When the indicator lamp is turned off, the light-emitting panel 2 displays black, and the light-emitting panel 2 and the mirror frame 8 appear to be an integral structure when they are viewed from surfaces thereof.

The light-emitting panel 2 is positioned on the inner side of the mirror frame 8, namely the inner side is a side which is close to a vehicle door, so that a driver can check conveniently, and the installation position of a steering lamp cannot be occupied.

The working principle is as follows. When the rearview mirror is used, the circuit board 5 is controlled by the body control module of the vehicle, so that the RGB lamp beads 4 emit light. The emitted light is refracted by the light path part 3, and uniform light is emitted through the light-emitting panel 2. The light has various colors, the light is linked with a sensor on the vehicle, and road conditions are prompted through the color change or the light flickering change. Therefore, lane change auxiliary alarm is realized.

The basic principles, principal features and advantages of the present disclosure are shown and described above. Those skilled in the art should understand that the present disclosure is not limited by the above-described embodiments, various changes and modifications may occur to the present disclosure under the premise of without departing from the spirit and scope of the present disclosure, and these changes and modifications will fall within the scope of the present disclosure as claimed. The scope of the present disclosure is defined by the appended claims and equivalents thereof.

What is claimed is:

1. A rearview mirror with an RGB indicator lamp, the rearview mirror comprising:
    a mirror shell;
    a mirror frame;
    a light module disposed inside the mirror shell, the light module comprising a housing, a circuit board, RGB light emitting diodes (LEDs), a light guide, and a transmissive panel,
    wherein:
        the circuit board, the RGB LEDs, the light guide, and the transmissive panel each are fixed in the housing,
        the light guide is a curved tube,
        an inner wall of the curved tube is provided with a diffuse reflection coating or texture that causes light emitted by the RGB LEDs to refract so as to emit uniform light concentrated at a target through the transmissive panel,
        the transmissive panel is disposed on the mirror frame, and
        the transmissive panel is a black transmissive panel configured to selectively cease to emit light to appear black.

2. The rearview mirror with the RGB indicator lamp according to claim 1, wherein each one of the RGB LEDs comprises a red diode, a green diode, and a blue diode, each of the red diode, the green diode, and the blue diode fixedly connected with the circuit board, and each of the red diode, the green diode, and the blue diode corresponding to a light inlet portion of the light guide.

3. The rearview mirror with the RGB indicator lamp according to claim 1, further comprising a quick plug, wherein the quick plug is electrically connected with the circuit board.

4. The rearview mirror with the RGB indicator lamp according to claim 1, wherein the transmissive panel is disposed on an inner side of the mirror frame.

* * * * *